United States Patent [19]

Bond et al.

[11] 4,360,086

[45] Nov. 23, 1982

[54] BRAKE ACTUATOR ASSEMBLY

[75] Inventors: Richard G. Bond, Union Lake; David J. Edwards, Utica, both of Mich.

[73] Assignee: Rockwell International Corporation, Pittsburgh, Pa.

[21] Appl. No.: 179,413

[22] Filed: Aug. 18, 1980

[51] Int. Cl.³ .............................................. F16D 65/30
[52] U.S. Cl. ...................................... 188/343; 74/110
[58] Field of Search .................. 74/110; 188/343, 367, 188/368; 285/365, 366, 407, 409, 410; 403/227, 335, 336, 338

[56] References Cited

U.S. PATENT DOCUMENTS

| 228,209 | 6/1880 | Meier | 285/365 X |
|---|---|---|---|
| 2,079,460 | 5/1937 | Marty | 403/336 X |
| 2,214,381 | 9/1940 | Rastetter | 403/338 X |
| 2,523,928 | 9/1950 | Szekely | 285/410 X |
| 3,395,584 | 8/1968 | Cox et al. | 188/343 X |

Primary Examiner—Duane A. Reger

[57] ABSTRACT

A brake assembly wherein a reciprocable wedge actuator projects into an actuator housing containing two oppositely slidable brake shoe associated plungers disposed in aligned bores having a common axis and a fluid pressure motor unit has a tubular support by which it is mounted on the housing with the wedge actuator extending between a fluid pressure responsive element of said motor and the inner ends of said plungers, the housing having a bore into which the tubular support extends, flange means on the tubular support and on the housing concentric with the bore, one of the flange means comprising a plurality of circumferentially spaced lugs, and a split lock ring having means extending radially inward from each edge to engage the flange means and secure the tubular support to the housing.

6 Claims, 4 Drawing Figures ic BRAKE ACTUATOR ASSEMBLY

BACKGROUND OF THE INVENTION

1. Field of the Invention

This invention is directed to a vehicle wheel brake actuator assembly and more specifically to improved means for mounting a fluid pressure motor to a wedge brake actuator housing.

The invention comprises a novel arrangement of elements for quickly and conveniently securing the tubular support of a fluid pressure motor to the brake actuator housing with the tubular support rotated and axially positioned relative to the housing to provide maximum brake performance and access for service and replacement purposes.

The invention is particularly useful in wedge actuated brakes of the types disclosed in U.S. Pat. No. 3,037,584. Such brakes are usually actuated by an air motor which drives a wedge reciprocably between a pair of plungers which serve to displace associated brake shoes into frictional contact with a surrounding brake drum. In such brakes it is of course important that the wedge be axially located in a predetermined position relative to the plungers in order to maintain maximum brake performance when the air motor is activated. It is also important that the means for mounting the air motor to the actuator housing be such as to permit rotation of the air motor to accommodate connection of the air lines. The means for securing the air motor to the actuator housing must also be durable enough to maintain integrity of the brake system and readily accessible and easy to attach and remove in order to facilitate maintenance, inspection and replacement services performed on the vehicle.

2. Description of the Prior Art

A number of different devices have been employed to connect a tubular fluid motor support to a wedge brake actuator housing. U.S. Pat. No. Re. 27,257 which issued to F. T. Cox et al. on Dec. 28, 1971 discusses the prior use of a "simple threaded connection" and then discloses the use of a lock ring wedged between a threaded connection to secure the assembly after the tubular support has been axially located relative to the actuator housing. When properly installed the lock nut has proven satisfactory in service but the nut is located in such an environment and is of such a dimension that at times it is difficult to engage a wrench on the lock nut with adequate clearance to fully tighten or loosen the lock nut.

Another assembly is disclosed in U.S. Pat. No. 3,434,359 which issued on Mar. 25, 1969 to W. J. Williams et al. In that patent a ring is rigidly secured circumferentially around a tubular support of an air motor and a retainer is drawn into abutment with that ring by means of nuts tightened on studs threaded to the actuator housing to force the end of the tubular support against a shoulder in a bore of the actuator housing. Although that assembly permits complete rotation of the tubular support relative to the actuator housing, the location of the studs in the actuator housing is pre-established and the stud and nut assembly may not be readily accessible in every vehicle installation.

SUMMARY OF THE INVENTION

The present invention provides an improved assembly for mounting a tubular support of a fluid pressure motor unit to a bore provided in a boss of a wedge brake actuator housing which comprises first flange means at the extremity of the boss and concentric with the boss, second flange means spaced a predetermined distance from the end of the tubular support and concentric therewith, with at least one of the flange means comprising a plurality of circumferentially spaced lugs, a split locking ring having a circumferentially extending base and means extending radially inward from each edge of the base, at least one of the means extending radially inward from the base comprising a plurality of tabs at spaced intervals along the base, the tabs being dimensioned and spaced to pass the circumferentially spaced lugs axially through the spaces between the tabs when the one flange is concentric with the ring and the lugs are aligned with the spaces and to prevent axial movement between the one flange and the ring when the lugs are aligned with the tabs, and means for pressing the tabs into contact with the lugs to secure the tubular support to the actuator housing.

In the preferred embodiment, the second flange means is comprised of an annulus secured to the tubular support and the annulus includes a plurality of lugs circumferentially spaced about its periphery. In the preferred embodiment, both of the means extending radially inward from each edge of the base of the ring are comprised of a plurality of tabs at spaced intervals.

The present invention and the advantages provided thereby will be more fully understood upon further study of the following description and the accompanying drawings.

BRIEF DESCRIPTION OF THE DRAWINGS

In the drawings wherein like reference numerals indicate the same parts.

DESCRIPTION OF THE PREFERRED EMBODIMENT

Figure 1:
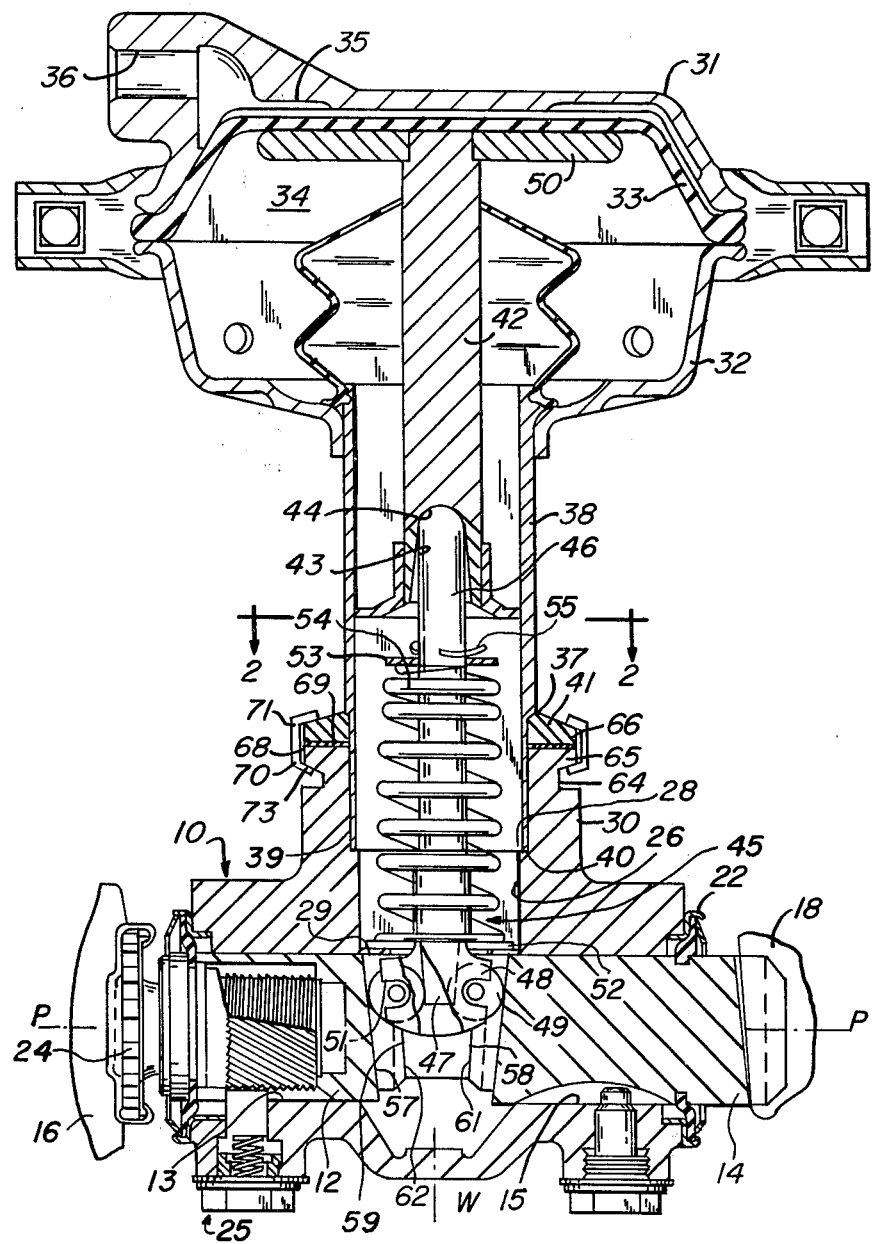
FIG. 1 is an assembly view mainly in section showing a fluid pressure motor unit mounted to a brake actuator housing in accordance with a preferred embodiment of the invention.
Figure 2:
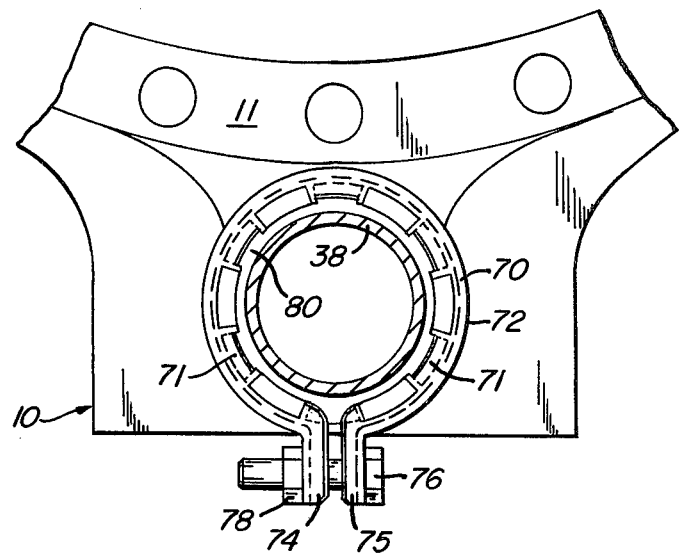
FIG. 2 is a sectional view along line 2—2 of FIG. 1.

With reference to FIGS. 1 and 2 there is shown a wedge brake actuator for a vehicle wheel which includes a fluid pressure motor unit mounted to an actuator housing in accordance with the present invention. The actuator housing 10 is preferably integral with a conventional brake spider or support 11 which is rigidly secured to a vehicle axle. Actuator housing 10 contains oppositely disposed coaxial plungers 12 and 14 nonrotatably slidable in bores 13 and 15 and operatively connected at their outer ends to the opposite ends of brake shoes indicated at 16 and 18 respectively. Where the plungers project from housing 10, suitble seals 20 and 22 are provided to prevent the entrance of foreign matter into the housing and to retain the lubricant contained therein.

One or both plungers 12 and 14 may be longitudinally adjustable either manually or automatically to compensate for lining wear on the brake shoes 16 and 18. A rotatable star wheel 24 is shown associated with plunger 12 for manual adjustment of the effective length of the plunger. An automatic adjustment for the purpose is shown at 25. These adjustments are preferably the same as disclosed in U.S. Pat. No. 3,068,964 issued Dec. 18, 1962.

Housing 10 is formed with a side opening comprising an inner cylindrical bore 26 and a coaxial outer larger diameter cylindrical bore 27, there being a flat smooth annular axially outwardly facing shoulder 28 at the bottom of bore 27. At the inner end of bore 26, opposed projections form diametrically opposite shoulder means within the opening at 29. As shown, bore 26 preferably lies within the actuator housing body while bore 27 is disposed within a projecting hollow boss 30. The common axis of bores 26 and 27 indicated at W—W is at right angles to the common axes of the plunger bores P—P.

A fluid pressure motor assembly 31 is composed of a multipart sheet metal casing 32 within which is peripherally clamped a flexible diaphragm 33 that defines fluid pressure chambers 34 and 35 at opposite sides thereof. The wall of casing 32 is formed with a threaded aperture 36 for connection of chamber 35 to a fluid pressure supply line (not shown) leading to the usual air pressure reservoir.

Casing 32 is provided with a rigid hollow mounting tubular support 38 which is cylindrical and stepped at 37 to a smaller diameter at its end region indicated at 39 so as to extend into housing bore 27, and terminating in a flat smooth annular end face 40 axially spaced from housing shoulder 28. An annular ring 41 of special characteristics as will appear is rigidly secured around the exterior of tube 38 at the step 37, either as by welding or by integral formation.

Abutting the center of diaphragm 33 is a rigid disc 50 to which is secured one end of a rod 42 that has its other end formed with a socket 43 having a spherical contour bottom 44.

A wedge assembly cartridge 45 consists essentially of a rod 46 having an integral wedge 47, a floating roller carrier 48, rollers 49 mounted in carrier slots 51, axially spaced washers 52 and 53 with a compression spring 54 between them surrounding the wedge and rod, and a fastener such as cotter key 55 extending through rod 46 adjacent washer 53. The wedge assembly 45 comprises a motion transmitting unit interposed between the motor diaphragm 33 and the actuator plungers 12 and 14.

As shown in FIG. 1, in the assembly the end of rod 46 opposite wedge 47 is formed to seat in recess 43, and rollers 49 are disposed to extend between the opposite inclined sides 56 of wedge 47 and similarly inclined plungers inner end slot surfaces 57. Surfaces 57 lie at the bottom of plunger end slots wide enough to receive the rollers.

Interiorly, housing 10 is formed with parallel anchor faces 58 and 59 which are adapted to be abutted by the plunger inner ends 61 and 62 respectively during normal operation, depending upon the direction of movement of the vehicle when the brake is applied.

In the assembly of FIG. 1, washer 52 of the wedge unit seats on body shoulder 29, and preferably washer 52 is nonrotatable with respect to bore 26 and has a rectangular wedge passing and guiding aperture, to assure that the wedge 47 and rollers 49 are properly oriented with respect to the inner ends of plungers 12 and 14.

Washer 52 and its nonrotatable mounting in bore 26 and its cooperation with the wedge may be the same as disclosed in U.S. Pat. No. 3,302,473 issued Feb. 7, 1967.

The structure and cooperation of the wedge, the floating carrier 48, the roller 49 and the inner ends of the plungers is preferably the same as disclosed in said U.S. Pat. No. 3,037,584.

The outer end of the boss 30 is undercut at 64 to provide a flange 65 concentric with the bore 27 and having a smooth flat surface 66 disposed normal to the axis W—W. The annulus 41 is formed with a smooth flat surface 68 which is also disposed normal to the axis W—W. The surfaces 66 and 68 are spaced by a fiber reinforced rubber gasket 69 and the annulus 41 is secured adjacent the flange 65 by a split lock ring 70.

Figure 3:
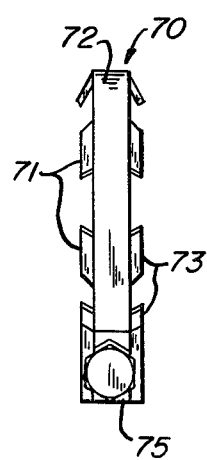
FIG. 3 is a side elevation of one of the clamping elements of the invention.

The split lock ring 70, as shown by FIGS. 2 and 3 is a split ring or clamp formed from a mild SAE 1010 to SAE 1020 steel having a circumferentially extending base 72. A plurality of tabs 71 located at spaced intervals about the ring extend radially inward from one edge of the ring base 70. A plurality of tabs 73 are also located at spaced intervals about the ring and extend radially inward from the other edge of the ring base 70.

Lugs 74, 75 are provided at each end of the ring base 72. Each lug 74, 75 is apertured to receive a bolt 76 which in combination with nut 78 can be tightened to draw the lugs 74, 75 together and the tabs 71 and 73 respectively in tighter contact with the annulus 41 and flange 65.

Figure 4:
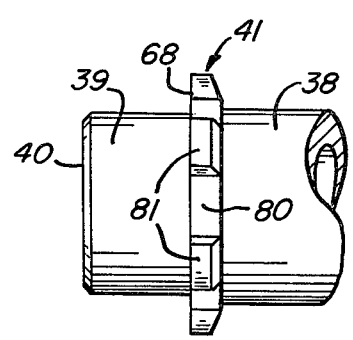
FIG. 4 is a fragmentary side elevation of another element of the invention.

The annulus 41 as shown by FIGS. 2 and 4 is comprised of a circular flange portion 80 having a plurality of circumferentially spaced radially extending lugs 81. During manufacture, the circular flange portion 80 is seated against the shoulder 37 of tubular support 38 to locate the annulus 41 a predetermined distance from the end face 40 and welded in place. The lugs 81 of annulus 41 and the spaces between the lugs 81 are dimensioned relative to the tabs 71, 73 of lock ring 70 and the spaces between the tabs 71 and the tabs 73 so the lugs 81 will pass axially through the spaces between the tabs 71 or the tabs 73 and the tabs 71 or 73 will pass axially through the spaces between the lugs 81 when the annulus 41 is concentric with the lock ring 72 and the lugs 81 are aligned with the spaces between the tabs 71 or the tabs 73. The dimensions of the lugs 81 and the tabs 71, 73 are also such that they prevent axial movement of the annulus 41 relative to the lock ring 72 when the annulus 41 is rotated to axially align the lugs 81 with the tabs 71 or the tabs 73.

During assembly of the tubular support 38 to the actuator housing 10 as shown in FIG. 1, the split lock ring 70 is loosely fitted about the flange 65 with the tabs 73 extending radially inward into the void provided by undercut 64. The gasket 69 is then fitted to end portion 39 of tubular support 38 and moved into abutment with the undersurface 68 of annulus 41. The end portion 39 of tubular support 38 is then inserted into bore 27 until the lugs 81 of annulus 41 approach the tabs 71 of lock ring 70. At this point the tubular support 38 or the lock ring 72 or both may be rotated to align the lugs 81 with the spaces between the tabs 71 thereby permitting the lugs 81 and annulus 41 to pass the tabs 71 of lock ring 70 and seat the gasket 69 firmly on the upper surface 66 of flange 65. The nut and bolt assembly 76, 78 is then partially tightened to loosely secure the tubular support 38 in the bore 27. The fluid motor casing 31 and lock ring 72 may now be rotated about the axis W—W to position the casing 31 anywhere within 360 degrees for attachment of the air line with optimum clearance of other elements in the environment within the wheel assembly. The nut and bolt assembly 76, 78 may be rotated to provide the best access either to the bolt head 76 or nut 78 in that particular wheel environment and then tightened to draw the annulus 41 and flange 65 into tight engagement with the gasket 69 by means of the lock ring tabs 71 and 73.

As pointed out previously, the annulus 41 is seated against the stepped shoulder 37 of tubular support 38 to locate the annulus 41 and its lower surface a predetermined distance from the end face 40 of tubular support 38 which serves as a reference plane for proper location of the fluid motor 31 relative to the brake actuator housing. In a similar manner the surface 66 of actuator housing 10 may be accurately located a fixed distance relative to the plunger axis P—P. Thus, allowing for the thickness of the gasket 69, when the surface 68 of annulus 41 firmly seats the gasket 69 against the surface 66 of flange 65, this establishes a known accurately predetermined axial distance between the fluid motor disc 50 and the plunger axis P—P and the internal components of the wedge assembly cartridge 45 and the fluid motor assembly 31 are automatically located in correct axial relationship. That is, the wedge 47 and the rollers 49 are properly located in optimum initial position between the inner ends of plungers 12 and 14 with the diaphragm 33 bottomed in chamber 35 at its limit of stroke in the brake disengaging direction. The plungers 12 and 14 at this time both being urged inwardly against the anchor surfaces 58 and 59 by the usual brake shoe return springs (not shown).

The present invention thus provides an improved assembly for mounting a tubular support to an actuator housing which permits rotation of the tubular support and its associated fluid motor to any position which will facilitate connection with the air supply hose and also permits rotation of the lock ring to any of a number of different positions to facilitate access to the nut and bolt assembly for tightening the split lock ring without interference with other elements in the wheel environment beneath a motor vehicle.

Either or both of these rotary adjustments may be made without affecting the axial position of the wedge assembly cartridge relative to the plungers within the actuator housing.

The lock ring may of course be formed with a plurality of tabs at one edge of the ring base and a continuous lip at the other edge. However, the provision of tabs at both edges of the lock ring base makes the lock ring somewhat more flexible and easier to attach to the actuator housing flange.

The present invention may be embodied in other specific forms without departing from the spirit or essential characteristics thereof. The embodiment of this invention described hereinabove is to be considered in all respects as illustrative and not restrictive, the scope of the invention being indicated by the appended claims rather than by the foregoing description and all changes which come within the meaning and range of equivalency of the claims are therefore intended to be embraced therein.

We claim:

1. In a brake assembly of the type wherein a reciprocating wedge actuator projects into an actuator housing containing two oppositely slidable brake shoe associated plungers disposed in aligned bores having a common axis and a fluid pressure motor unit has a tubular support by which it is adapted to be mounted on said housing with said wedge actuator extending between a fluid pressure responsive element of said motor and the inner ends of said plungers, said housing having a boss including a bore, the improvement that comprises first flange means at the extremity of said boss concentric with said bore, second flange means spaced a predetermined distance from the end of said tubular support and concentric therewith, at least one of said flange means comprising a plurality of circumferentially spaced lugs, a split lock ring having a circumferentially extending base and means extending radially inward from each edge of said base, at least one of said means extending radially inward from said base comprising a plurality of tabs at spaced intervals along said base, said lugs and said tabs being dimensioned and spaced to pass each other axially when said one flange means is concentric with said ring and said lugs are aligned with the spaces between said tabs while permitting independent rotation of said lock ring and said second flange means relative to said first flange means, and to prevent axial movement between said one flange means and said ring when said lugs are aligned with said tabs, and means for drawing said tabs into contact with said lugs to secure said support to said housing.

2. The brake assembly defined by claim 1 wherein said second flange means is comprised of said plurality of circumferentially spaced lugs.

3. The brake assembly defined by claim 1 wherein said second flange means comprises an annulus secured to said tubular support and said annulus includes a plurality of lugs circumferentially spaced about its periphery.

4. The brake assembly defined by claim 3 wherein the outer diameter of said tubular support is stepped to a smaller diameter thereby providing a shoulder locating said annulus a predetermined distance from the end of said tubular support.

5. The brake assembly defined by claim 1 wherein said second flange means comprises an annulus secured to said tubular support and said tubular support includes a shoulder locating said annulus a predetermined distance from the end of said tubular support.

6. The brake assembly defined by claim 1 wherein both of said means extending radially inward from said base comprise a plurality of tabs at spaced intervals along each edge of said base.

* * * * *